US010881230B2

(12) United States Patent
Bessac et al.

(10) Patent No.: US 10,881,230 B2
(45) Date of Patent: Jan. 5, 2021

(54) CAMPING UTENSIL KIT

(71) Applicant: Fiskars Brands, Inc., Middleton, WI (US)

(72) Inventors: Grant Bessac, Beaverton, OR (US); Charlie Hartzell, Portland, OR (US)

(73) Assignee: Fiskars Brands, Inc., Middleton, WI (US)

( * ) Notice: Subject to any disclaimer, the term of this patent is extended or adjusted under 35 U.S.C. 154(b) by 348 days.

(21) Appl. No.: 16/148,339

(22) Filed: Oct. 1, 2018

(65) Prior Publication Data

US 2019/0099024 A1    Apr. 4, 2019

Related U.S. Application Data

(60) Provisional application No. 62/567,101, filed on Oct. 2, 2017.

(51) Int. Cl.
| | | |
|---|---|---|
| *A47G 21/06* | (2006.01) | |
| *A47G 21/10* | (2006.01) | |
| *A47J 17/02* | (2006.01) | |
| *B67B 7/16* | (2006.01) | |
| *A47J 43/28* | (2006.01) | |
| *B26B 11/00* | (2006.01) | |

(52) U.S. Cl.
CPC ............. *A47G 21/06* (2013.01); *A47G 21/10* (2013.01); *A47J 17/02* (2013.01); *A47J 43/283* (2013.01); *B67B 7/16* (2013.01); *B26B 11/00* (2013.01)

(58) Field of Classification Search
CPC ......... A47G 21/06; A47G 21/10; A47J 17/02; A47J 43/283; A47J 43/28; A47J 43/00; B67B 7/16; B26B 11/00
See application file for complete search history.

(56) References Cited

U.S. PATENT DOCUMENTS

| 1,260,302 A | 3/1918 | Barrows | |
| 4,995,154 A * | 2/1991 | Bamber | A47G 21/06 |
| | | | 30/147 |

(Continued)

FOREIGN PATENT DOCUMENTS

| EP | 0 965 297 A1 | 12/1992 |
| WO | WO-2014/179173 A2 | 11/2014 |

OTHER PUBLICATIONS

International Search Report and Written Opinion for International Application No. PCT/US2018/053717, dated Jan. 7, 2019, 13 pages.

*Primary Examiner* — David B. Thomas

(74) *Attorney, Agent, or Firm* — Foley & Lardner LLP

(57) ABSTRACT

A camping tool including a spatula including a blade, a spatula handle, a tongs dovetail connector arranged on a first side of the spatula handle, and a storage dovetail connector arranged on a second side of the spatula handle opposite the first side, a spoon including a bowl, a spoon handle, and a spoon connector including a spoon flange sized to be received in the tongs dovetail connector or the storage dovetail connector, a fork including tines, a fork handle, and a fork connector including a fork flange sized to be received in the tongs dovetail connector or the storage dovetail connector, and a tool including at least one of a can opener, a package opener, a bottle opener, and a vegetable peeler, and a tool flange sized to be received in the storage dovetail connector.

20 Claims, 9 Drawing Sheets

(56) References Cited

U.S. PATENT DOCUMENTS

| | | | |
|---|---|---|---|
| 5,054,835 A * | 10/1991 | Loechel ................ | A47G 21/10 294/99.2 |
| 2014/0026425 A1 | 1/2014 | Kim | |
| 2017/0027353 A1* | 2/2017 | Merkurieff ............ | A47G 21/06 |

* cited by examiner

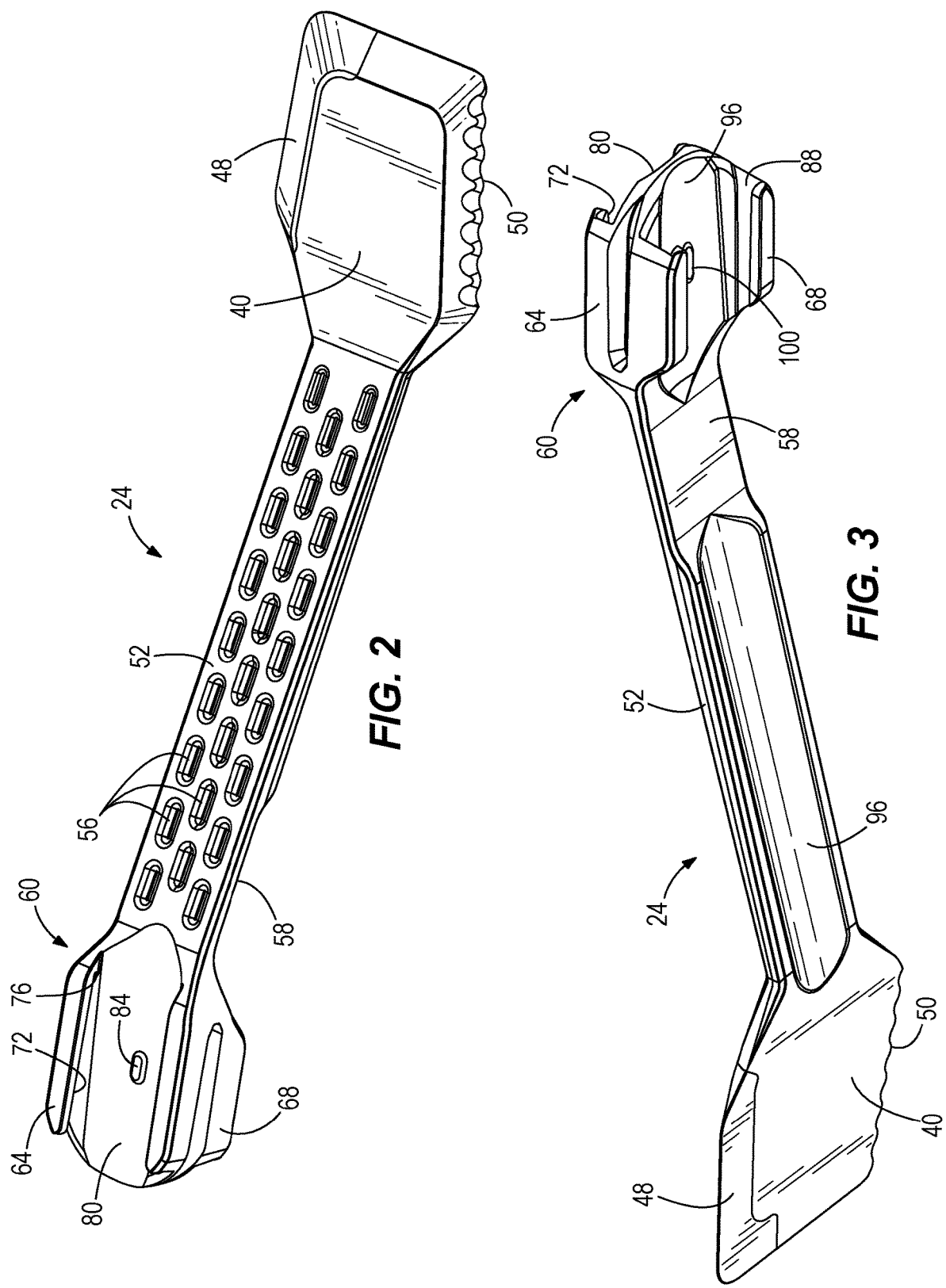

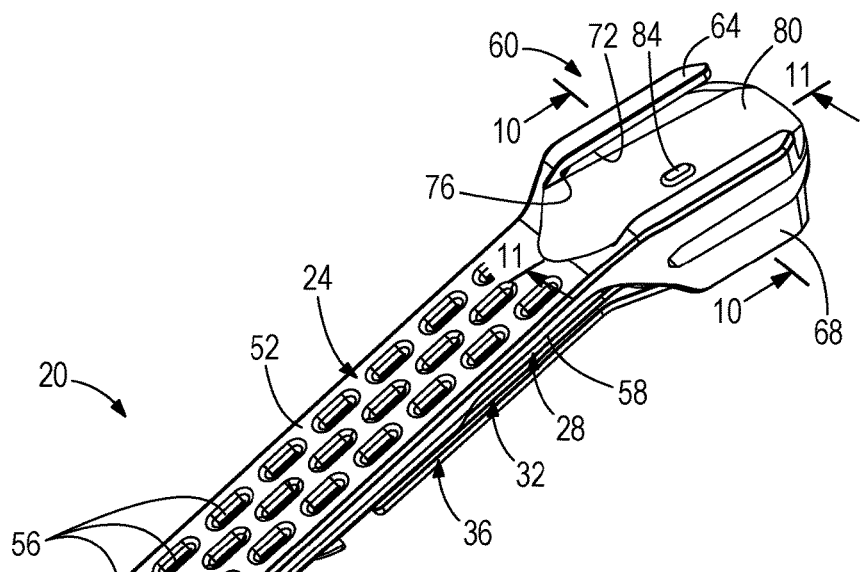
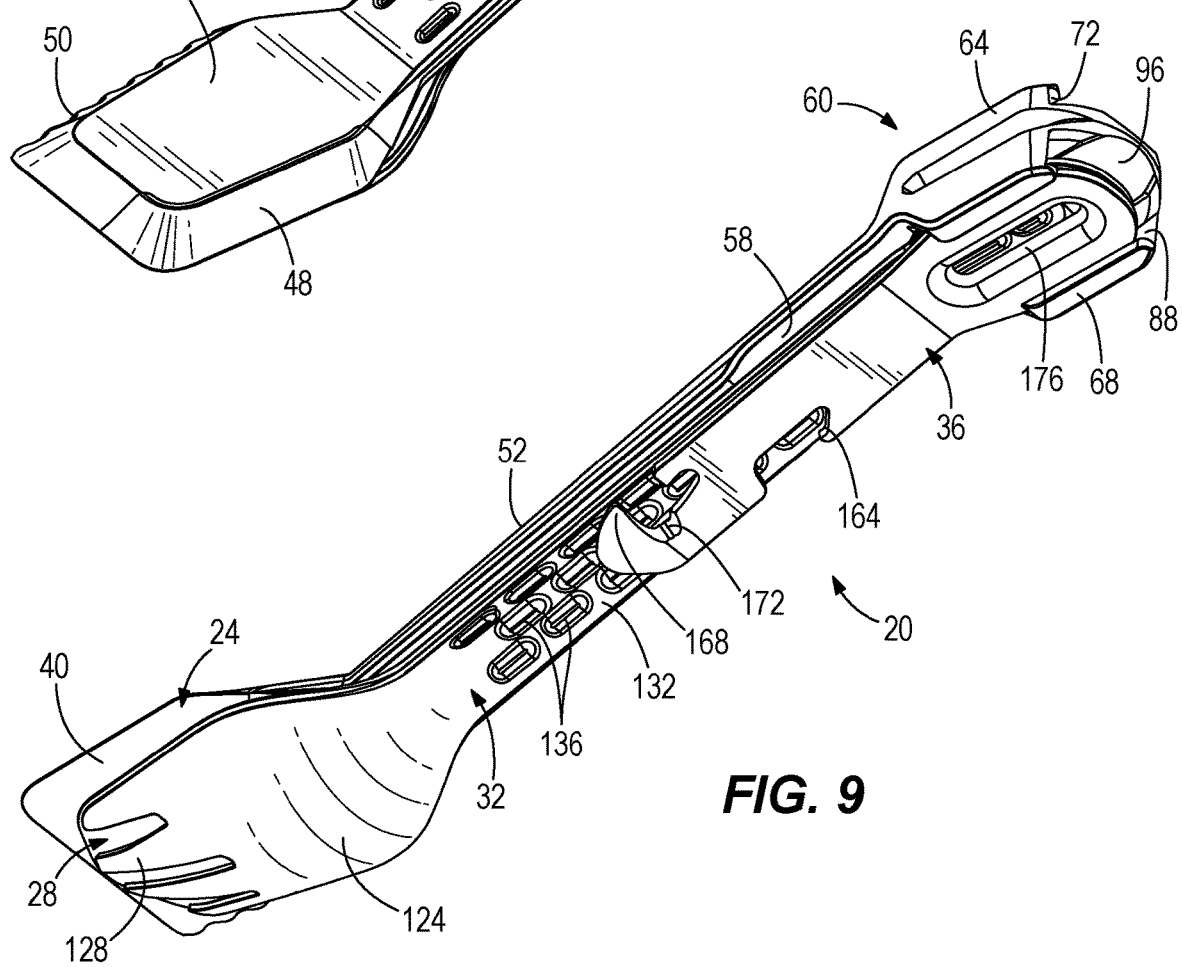

US 10,881,230 B2

CAMPING UTENSIL KIT

CROSS-REFERENCE TO RELATED APPLICATION

This application claims the benefit of and priority to U.S. Provisional Application No. 62/567,101, filed Oct. 2, 2017, the content of which is hereby incorporated by reference in its entirety.

BACKGROUND

The present invention relates generally to camping tools. More specifically, the present invention relates to camping tools used for eating or cooking.

SUMMARY

One embodiment relates to a camping utensil kit that includes a first utensil including a first food portion, a tongs dovetail connector, and a storage dovetail connector. A second utensil includes a second food portion, and a flange sized to be received within the tongs dovetail connector or the storage dovetail connector. When the flange is received in the tongs dovetail connector, the camping utensil kit operates as a tongs, and when the flange is received in the storage dovetail connector, the camping utensil kit is in a storage arrangement.

Another embodiment relates to a camping tool that includes a spatula including a blade, a spatula handle, a tongs dovetail connector arranged on a first side of the spatula handle, and a storage dovetail connector arranged on a second side of the spatula handle opposite the first side. A spoon includes a bowl, a spoon handle, and a spoon connector including a spoon flange sized to be received in the tongs dovetail connector or the storage dovetail connector. A fork includes tines, a fork handle, and a fork connector including a fork flange sized to be received in the tongs dovetail connector or the storage dovetail connector. A tool includes at least one of a can opener, a package opener, a bottle opener, and a vegetable peeler, and a tool flange sized to be received in the storage dovetail connector.

Another embodiment relates to a method that includes slidingly engaging a storage slot of a first utensil dovetail connector with a flange of a second utensil to provide a compact storage arrangement, slidingly engaging a tongs slot of the first utensil dovetail connector with the flange of the second utensil to provide a tongs arrangement, and flexing the first utensil, via a living spring, while in the tongs arrangement.

Alternative exemplary embodiments relate to other features and combinations of features as may be generally recited in the claims.

BRIEF DESCRIPTION OF THE FIGURES

The disclosure will become more fully understood from the following detailed description, taken in conjunction with the accompanying figures, in which:

FIG. 2 is a perspective view of a spatula of the camping utensil kit of FIG. 1.

FIG. 3 is a perspective view of the spatula of the camping utensil kit of FIG. 1.

FIG. 8 is a perspective view of the camping utensil kit of FIG. 1 in a storage arrangement.

FIG. 9 is a perspective view of the camping utensil kit of FIG. 1 in the storage arrangement.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring generally to the drawings, a camping utensil kit is shown and described that includes a spatula, a spoon, a fork, and a tool. The spatula includes a storage structure and a tongs structure. The storage structure receives and maintains the spoon, fork, and tool in a compact storage arrangement. The tongs structure receives one of the spoon or fork in a tongs arrangement with the spatula. The tool includes a bottle opener, a can opener, a package opener, and a vegetable peeler. The camping utility kit is compact and easy to store in the storage arrangement, and functions as either a spoon or fork tongs in the tongs arrangement. The tool fits into the storage arrangement and adds additional functionality. Each of the spatula, the spoon, the fork, and the tool may also be used individually.

Figure 1:
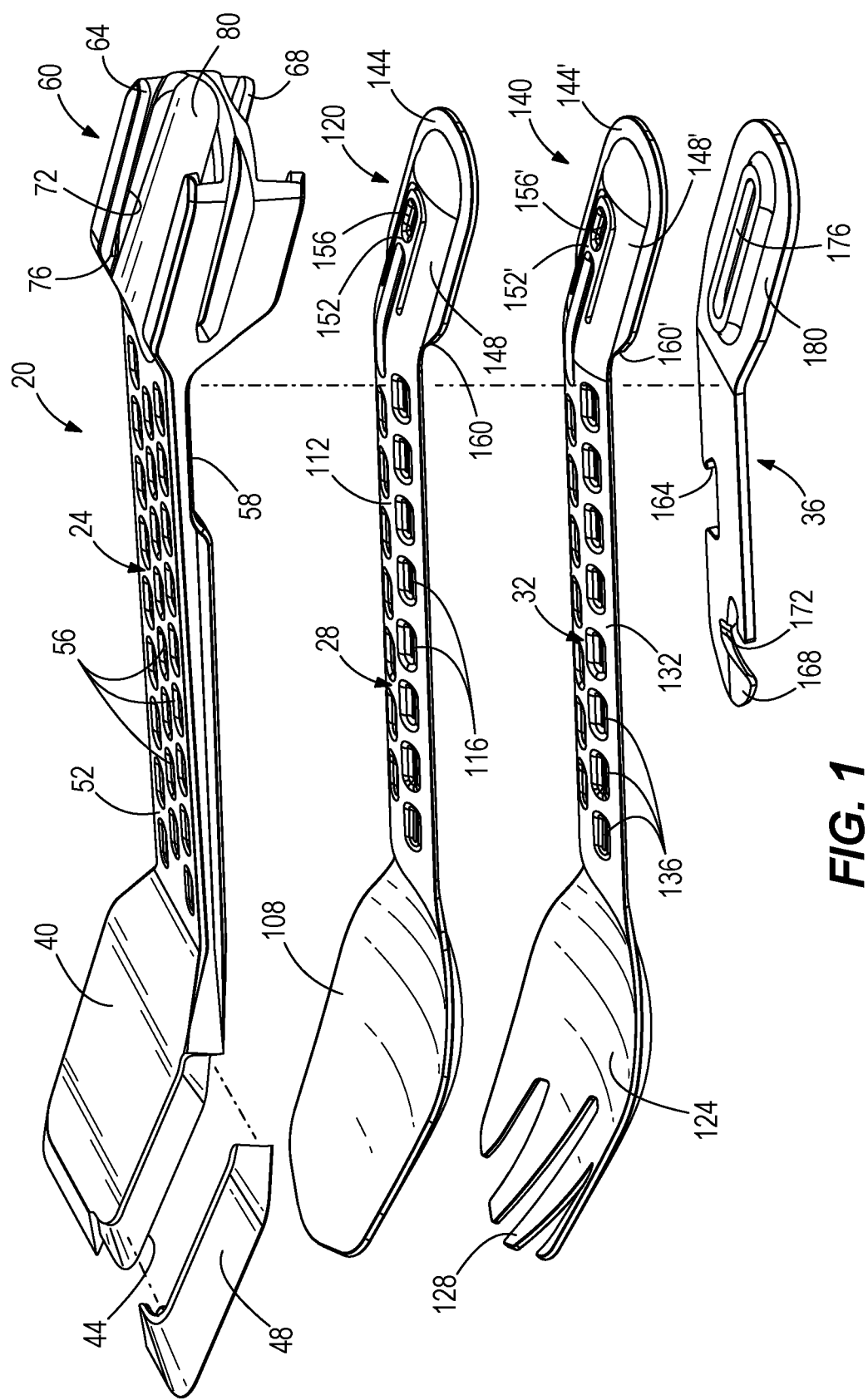
FIG. 1 is an exploded perspective view of a camping utensil kit in accordance with an exemplary embodiment.

As shown in FIG. 1, a camping tool in the form of a camping utensil kit 20 includes a first utensil in the form of a spatula 24, a second utensil in the form of a spoon 28, a third utensil in the form of a fork 32, and a tool 36. The camping utensil kit 20 is usable in both a storage arrangement (shown in FIGS. 8 and 9), a tongs arrangement (shown in FIG. 12), and as individual utensils and tools.

The spatula 24 includes a broad and substantially flat blade 40 that includes a knife edge 44 selectively covered by a cap 48 and a scalloped edge 50 (see FIG. 2). In some embodiments, the knife edge 44 and/or the scalloped edge 50 are eliminated, or the shape of the blade 40 is different, as desired.

As shown in FIGS. 2 and 3, a spatula handle 52 extends from the blade 40 and includes a grip structure in the form of dimples 56 that provide a comfortably graspable handle 52 for a user. The spatula handle 52 includes a flexible portion in the form of a leaf spring or a living spring 58. In some embodiments, the living spring 58 is a portion of reduced thickness relative to the handle 52 and provides a spring action with touch and rebound to the spatula 24 when used in the tongs arrangement.

Figure 10:
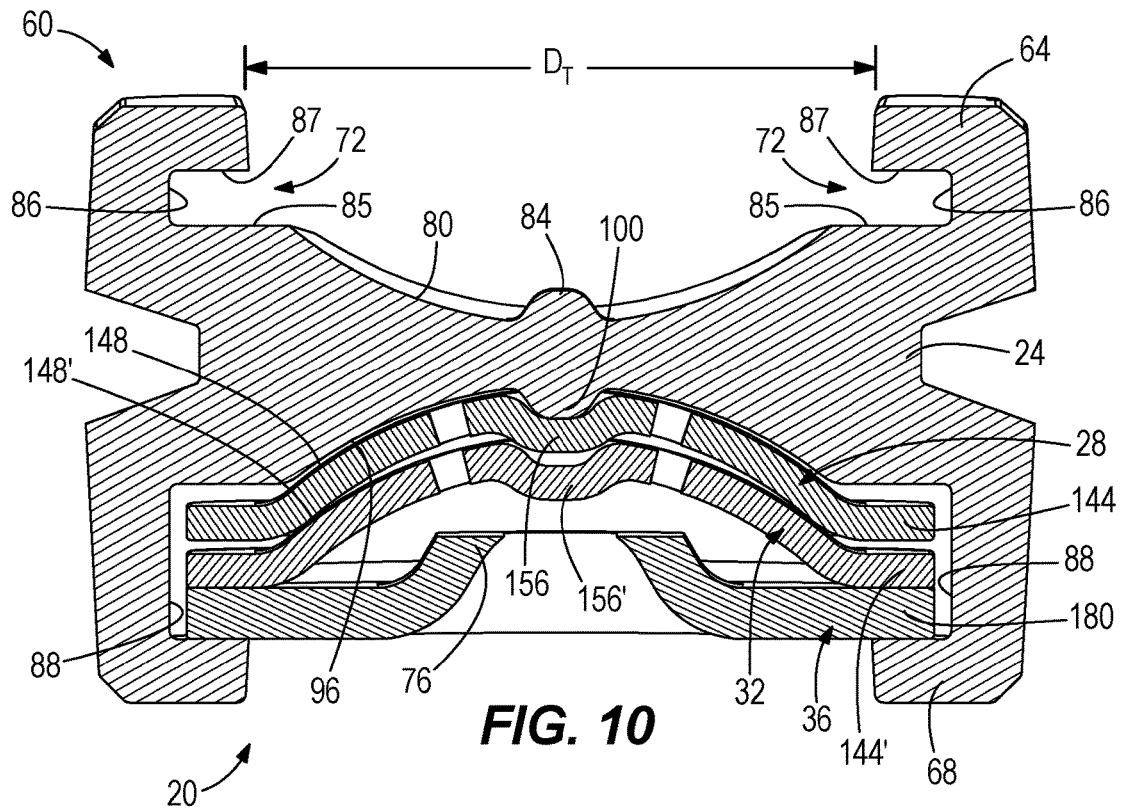
FIG. 10 is a section view of the camping utensil kit of FIG. 9 taken along line 10-10 of FIG. 9.

A spatula connector 60 is coupled to the handle 52 and includes a tongs structure in the form of a tongs cavity or dovetail 64 and a storage structure in the form of a storage cavity or dovetail 68 arranged on a side of the spatula 24 opposite the tongs dovetail 64. The tongs dovetail 64 includes tapered tongs slots 72, ending in tong shoulders 76, a tong profile in the form of a concave tong surface 80, and a tong detent in the form of a projection or a tong dimple 84 (see FIG. 2). In general, a dovetail connector as used herein, refers to a cavity that includes walls on three sides and an opening through which another component may enter. The dovetails capture or otherwise constrain movement of the spoon 28, the fork 32, and/or the tool 36. As shown in FIG. 10, each of the tongs slots 72 is defined by a base wall 85 extending from the concave tong surface 80, a side wall 86 extending substantially perpendicular from the base wall 85 to define a tong slot height $H_T$ (see FIG. 15), and an overhang wall 86 extending substantially perpendicular from the side wall 85. The two overhang walls 86 are spaced apart from each other by a tongs distance $D_T$ (see FIG. 10).

Figure 13:
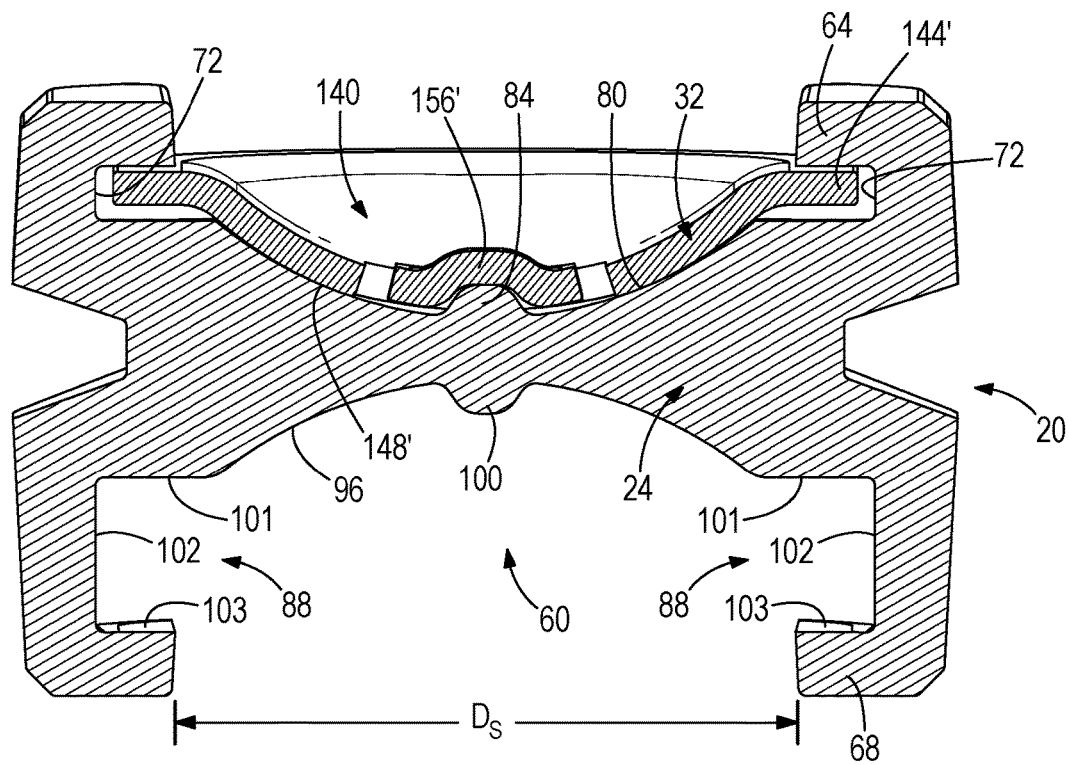
FIG. 13 is a section view of the camping utensil kit of FIG. 12 taken along line 13-13 of FIG. 12.

As shown in FIG. 3, the storage dovetail 68 includes tapered storage slots 88, a storage profile in the form of a concave storage surface 96, and a storage detent in the form of a projection or a storage dimple 100. The storage surface 96 extends substantially along the spatula handle 52, as clearly shown in FIG. 3. As shown in FIG. 13, each of the storage slots 88 is defined by a base wall 101 extending from the concave storage surface 96, a side wall 102 extending substantially perpendicular from the base wall 101 to define a storage slot height $H_S$ (see FIG. 15), and an overhang wall 103 extending substantially perpendicular from the side wall 102. The two overhang walls 103 are spaced apart from each other by a storage distance $D_S$ (see FIG. 13).

Figure 4:
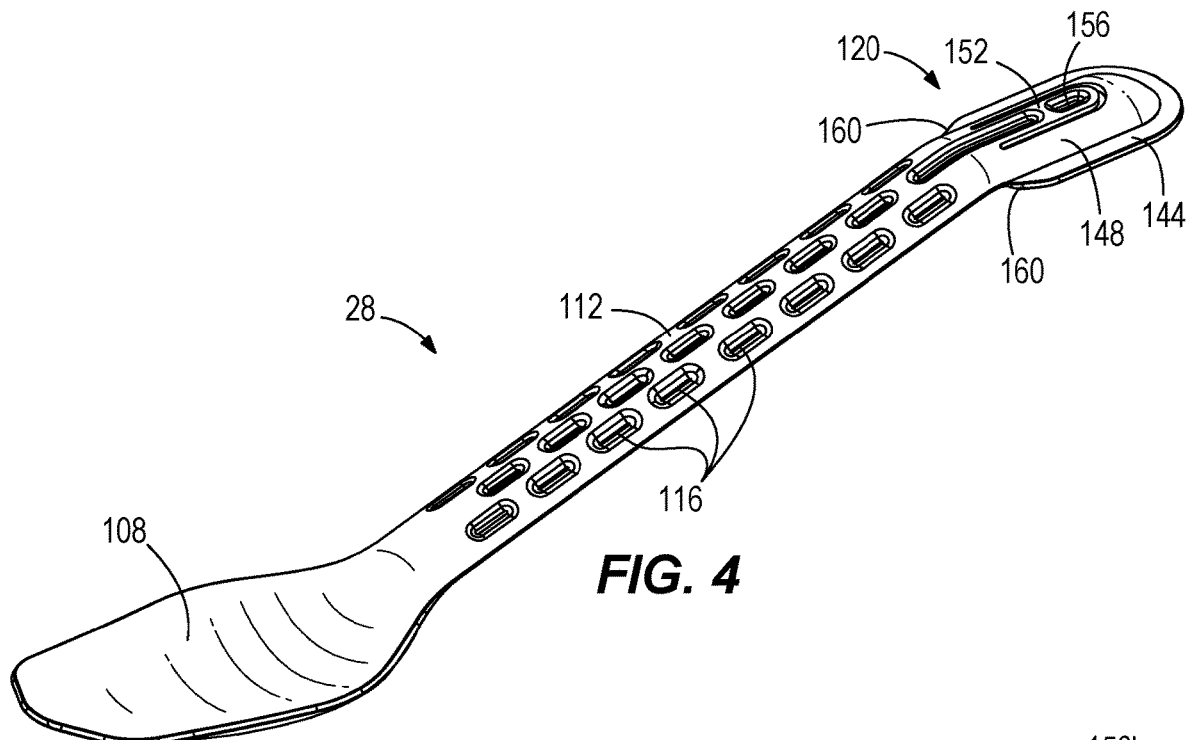
FIG. 4 is a perspective view of a spoon of the camping utensil kit of FIG. 1.

As shown in FIG. 4, the spoon 28 includes a spoon bowl 108, a spoon handle 112 that includes a grip structure in the form of dimples 116 that provide a comfortably graspable handle 112 for the user, and a spoon connector 120. The spoon handle 112 is sized to fit through the tongs distance $D_T$ and the storage distance $D_S$.

Figure 5:
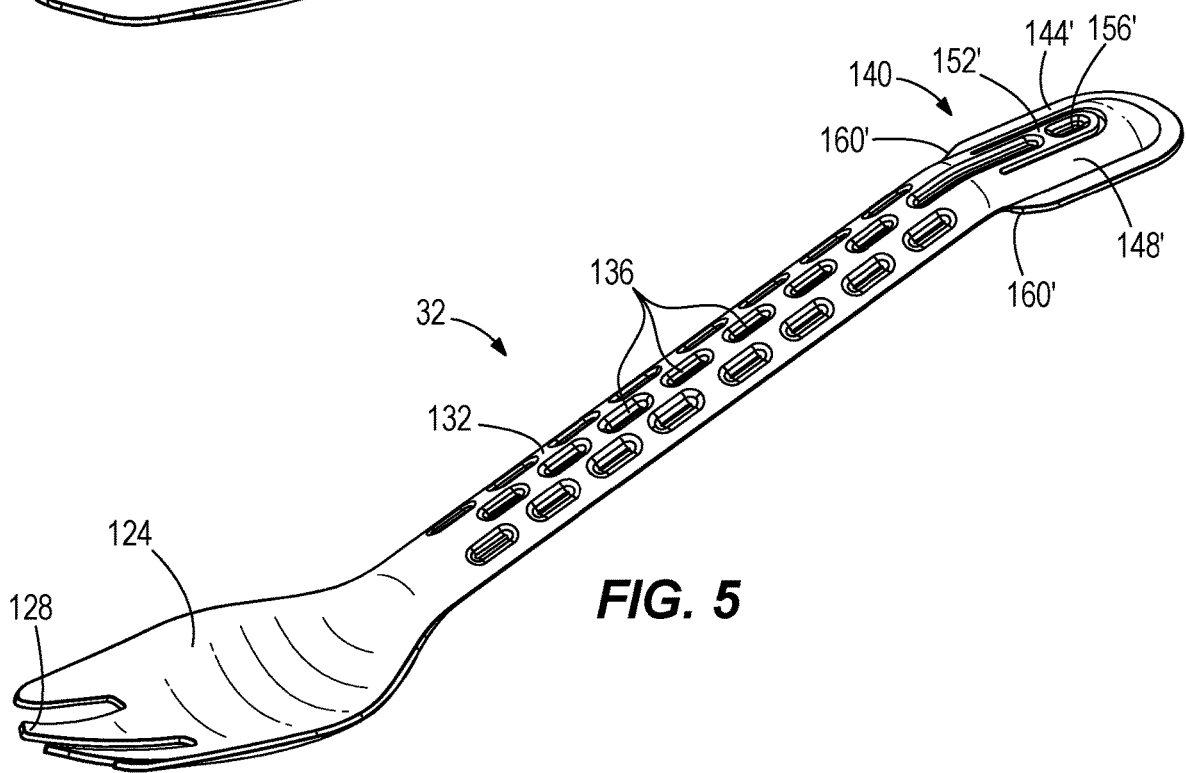
FIG. 5 is a perspective view of a fork of the camping utensil kit of FIG. 1.

As shown in FIG. 5, the fork 32 includes a fork bowl 124 having fork tines 128, a fork handle 132 that includes a grip structure in the form of dimples 136 that provide a comfortably graspable handle 132 for the user, and a fork connector 140. The spoon connector 120 and the fork connector 140 have substantially similar structure. The fork handle 132 is sized to fit through the tongs distance $D_T$ and the storage distance $D_S$.

Figure 6:
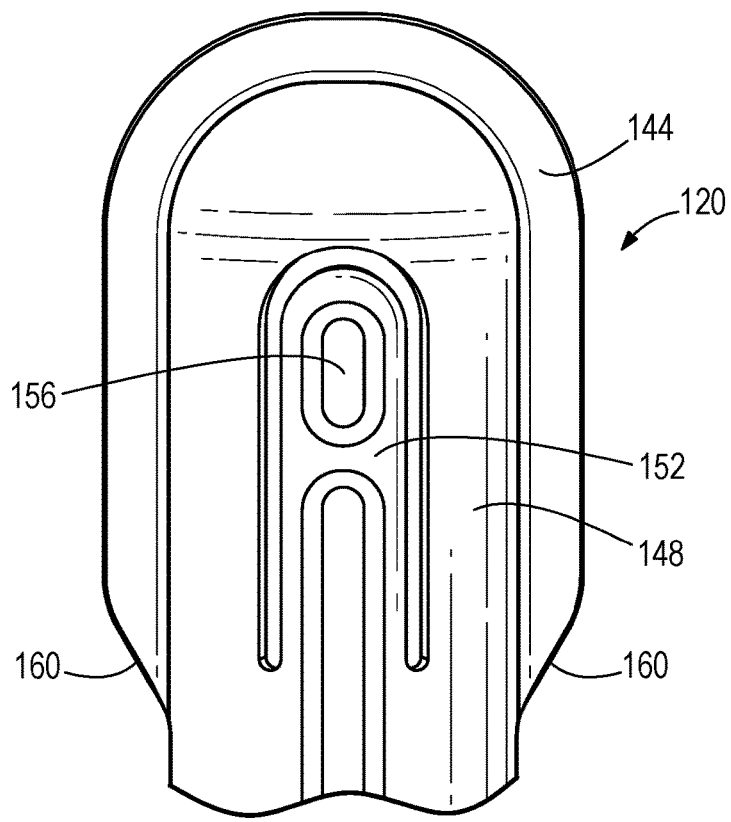
FIG. 6 is a top view of a spoon connector of the spoon of FIG. 4.

As shown in FIG. 6, the spoon connector 120 includes a flange 144 sized to be received within the tongs slots 72 and the storage slots 88, a convex surface 148 shaped to mate with both the tongs surface 80 and the storage surface 96, and a spring member in the form of a finger 152 that includes a recess or depression 156 shaped to receive the tongs dimple 84 or the storage dimple 100. In the illustrated embodiments, the convex surface 148 extends along substantially the entire length of the spoon handle 112 and mates with the storage surface 96 along the length of the spatula handle 52. The finger 152 is structured to flex, allowing the depression 156 to slide over the tongs dimple 84 or the storage dimple 100 during insertion or withdrawal so that the depression 156 receives or captures the tongs dimple 84 or the storage dimple 100. The flange 144 includes an obliquely angled leading edge 160 relative to the flange 144 that increases the ease of insertion into the tongs slots 72 or storage slots 88. The fork connector 140 is substantially similar to the spoon connector 120 and is labelled with like reference numbers in the prime series.

Figure 7:
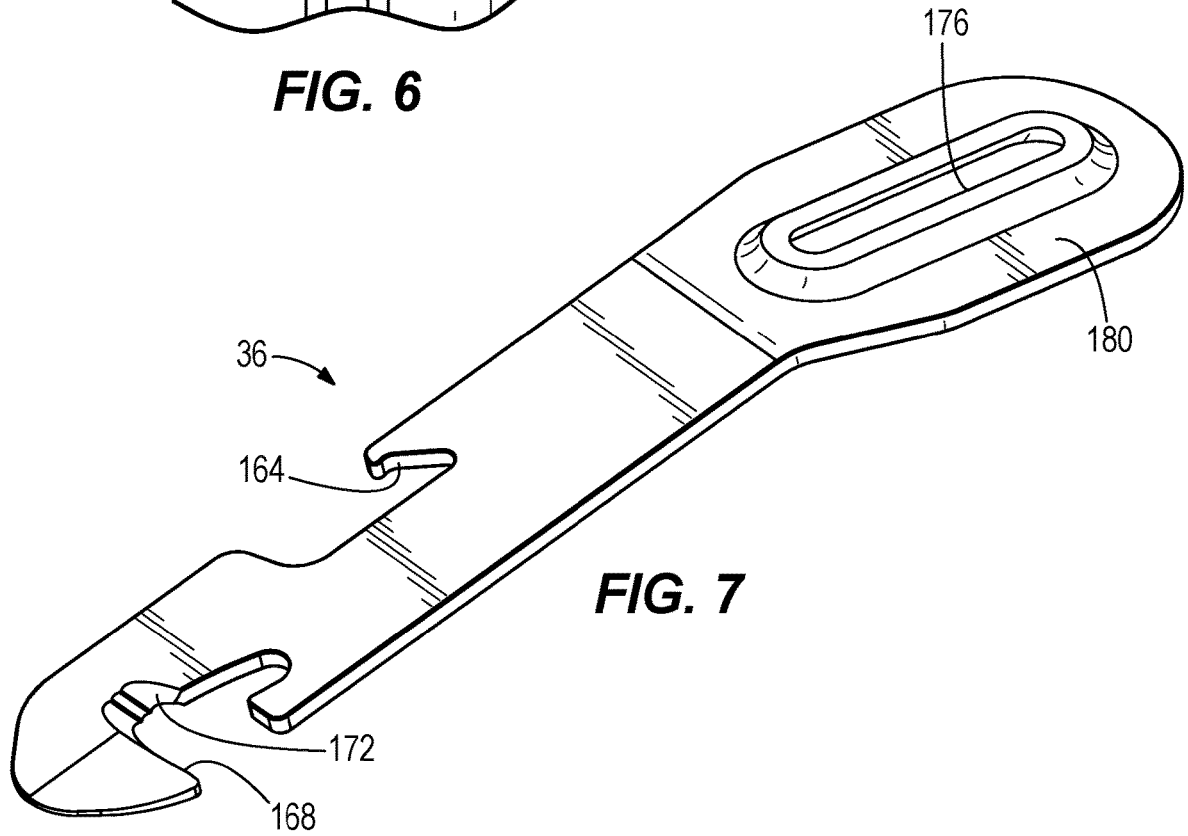
FIG. 7 is a perspective view of a tool of the camping utensil kit of FIG. 1.

As shown in FIG. 7, the tool 36 includes a bottle opener 164, a can opener 168, a package opener including a serrated gut-hook 172, a vegetable peeler 176, and a flange 180 sized to be receive within the storage slots 88. In some embodiments, the tool 36 can include other features, such as a pry bar, a screw driver head, a knife edge, or another feature.

Figure 11:
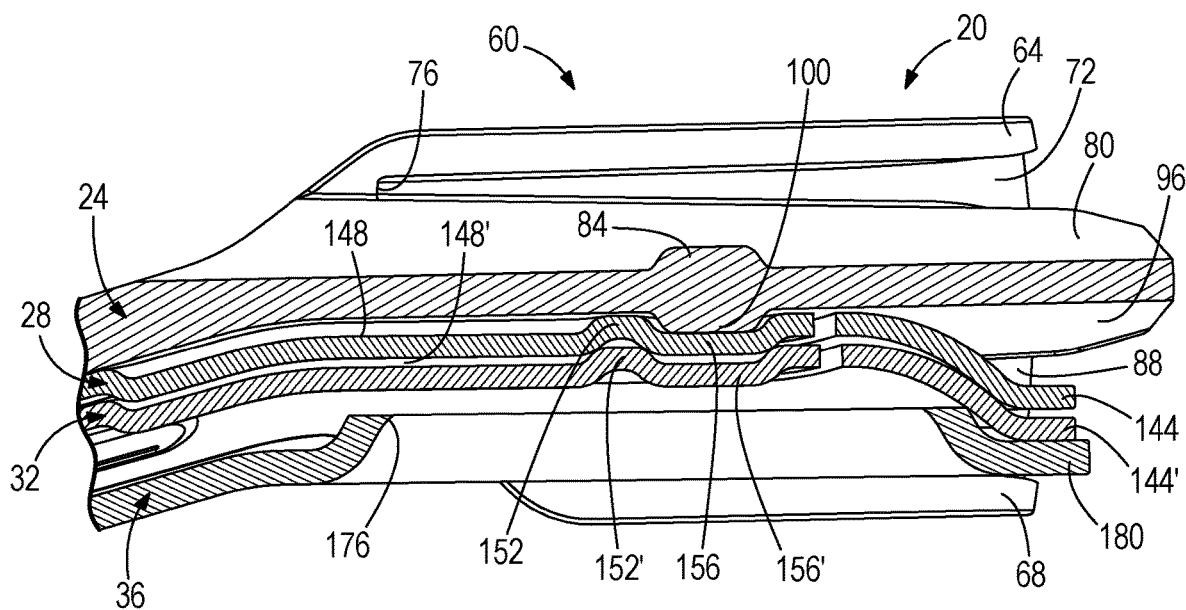
FIG. 11 is a section view of the camping utensil kit of FIG. 9 taken along line 11-11 of FIG. 9.

As shown in FIGS. 8 and 9, when the camping utensil kit 20 is in the storage arrangement, the spoon 28 and fork 32 are positioned on top of the tool 36, and the stacked spoon 28, fork 32, and tool 36 are slid into the storage dovetail 68 from a back side toward the blade 40. The spoon 28, fork 32, and tool 36 are securely held in place by the storage dimple 100 and by engagement with the storage slots 88, and the convex surfaces 148 engage the concave surface 96 of the spatula 24. The spoon 28, fork 32, and tool 36 are removed from the spatula 24 by sliding toward the back or away from the blade 40. As shown in FIGS. 10 and 11, the storage dimple 100 directly engages the depression 156 of the spoon 28, and the depression 156 of the spoon 28 in turn engages the depression 156 of the fork 32. The tool 36 is held in place by engagement with the storage slots 88.

Figure 12:
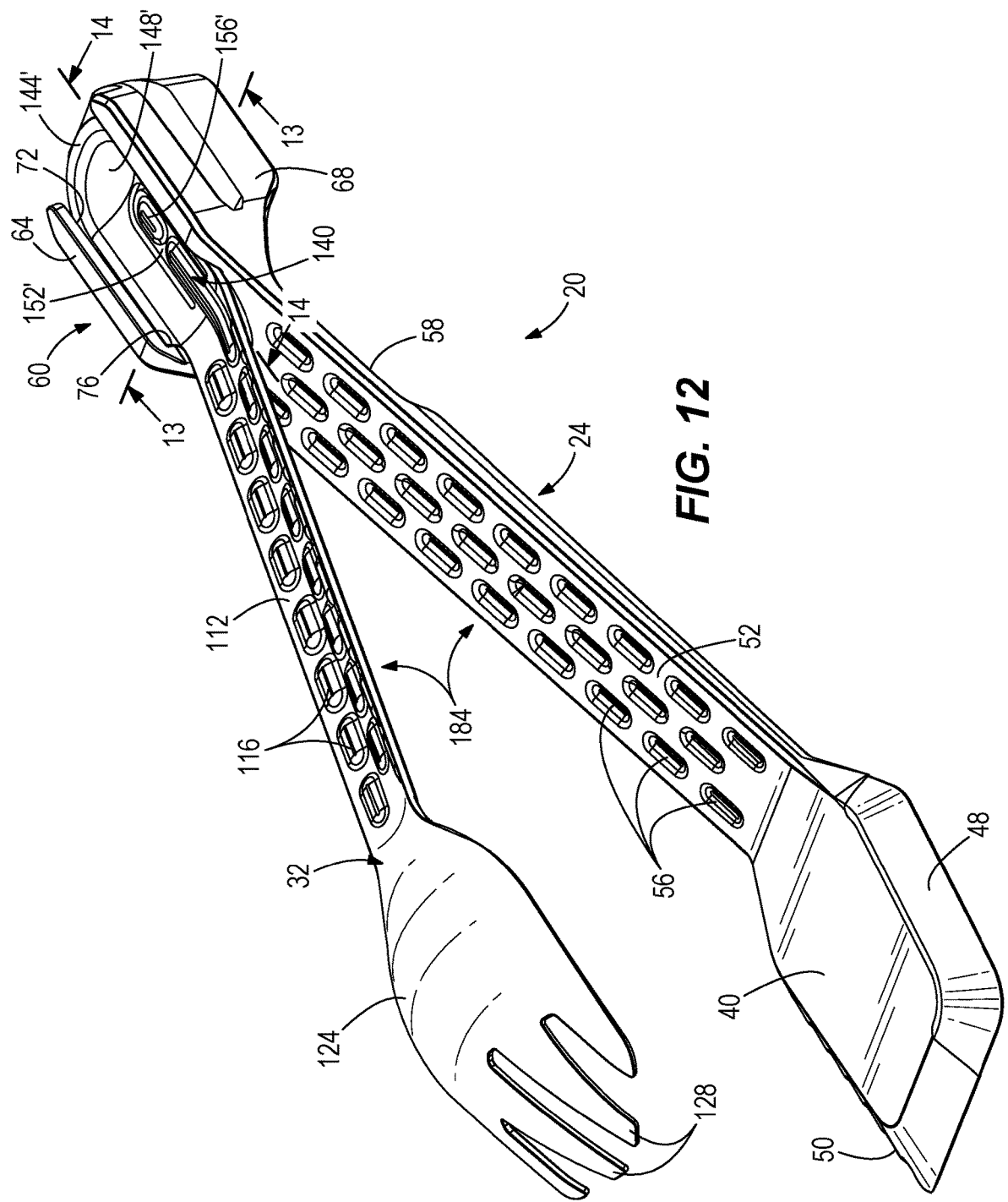
FIG. 12 is a perspective view of the camping utensil kit of FIG. 1 in a tongs arrangement.

As shown in FIG. 12, when the camping utensil kit 20 is in the tongs arrangement, the fork 32 (or spoon 28) is engaged with the tongs dovetail 64 with the convex surface 148 of the fork 32 engaged with the concave surface 80 of the tongs dovetail 64 such that the tines 128 of the fork 32 are separated from the blade 40 of the spatula 24 and the tines 128 and blade 40 may be brought closer to one another. The living spring 58 provides flexibility to the spatula 24 and makes the actuation of the fork 32 and spatula 24 easier when used in the tongs arrangement. The living spring 58 allows the blade 40 of the spatula 24 to be bent toward the tines 128 of the fork 32 relative to the spatula connector 60 while the fork connector 140 is engaged with the tongs connector 64 of the spatula 24.

In some embodiments, the spatula connector 60 is arranged relative to the spatula handle 52 at an oblique angle 182 (see FIG. 14) of about a fifteen degrees (15°) and the flanges 144 of the spoon 28 and fork 32 are arranged at an oblique angle 183 of about fifteen degrees (15°) relative to the respective handles 112, 132. When the camping utensil kit 20 is in the tongs arrangement, a rest angle 184 between the spatula handle 52 and the spoon handle 112 or the fork handle 132 is about thirty degrees (30°). In some embodiments, the rest angle 184 between the spatula handle 52 and the spoon handle 112 or the fork handle 132 is between about twenty degrees (20°) and about forty-five degrees (45°).

Figure 14:
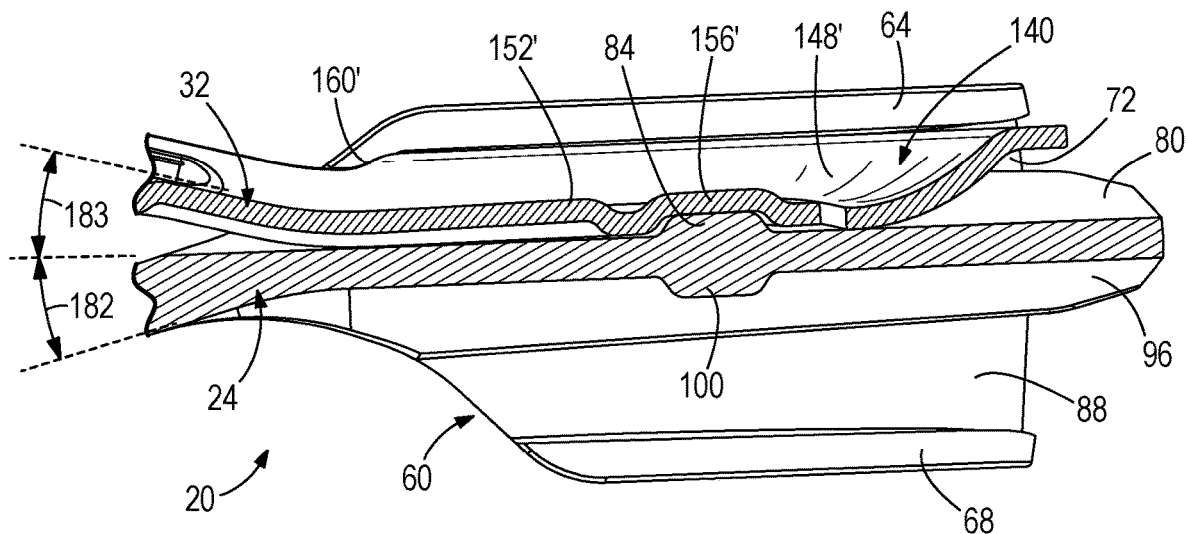
FIG. 14 is a section view of the camping utensil kit of FIG. 12 taken along line 14-14 of FIG. 12.

As shown in FIGS. 13 and 14, the tongs slots 72 are sized to receive the flange 144 and the tongs dimple 84 is sized to engage the depression 156 to maintain the fork 32 (or spoon 28) in the tongs arrangement. The tongs shoulders 76 are positioned to aid in alignment during use of the tongs arrangement. A user can slide the fork 32 into the tongs dovetail 64 until the leading edges 160 of the flange 144 engage or contact the tongs shoulder 76. In this position, the tines 128 of the fork 32 will align with the front edge of the blade 40 and the tongs arrangement can be used effectively.

Figure 15:
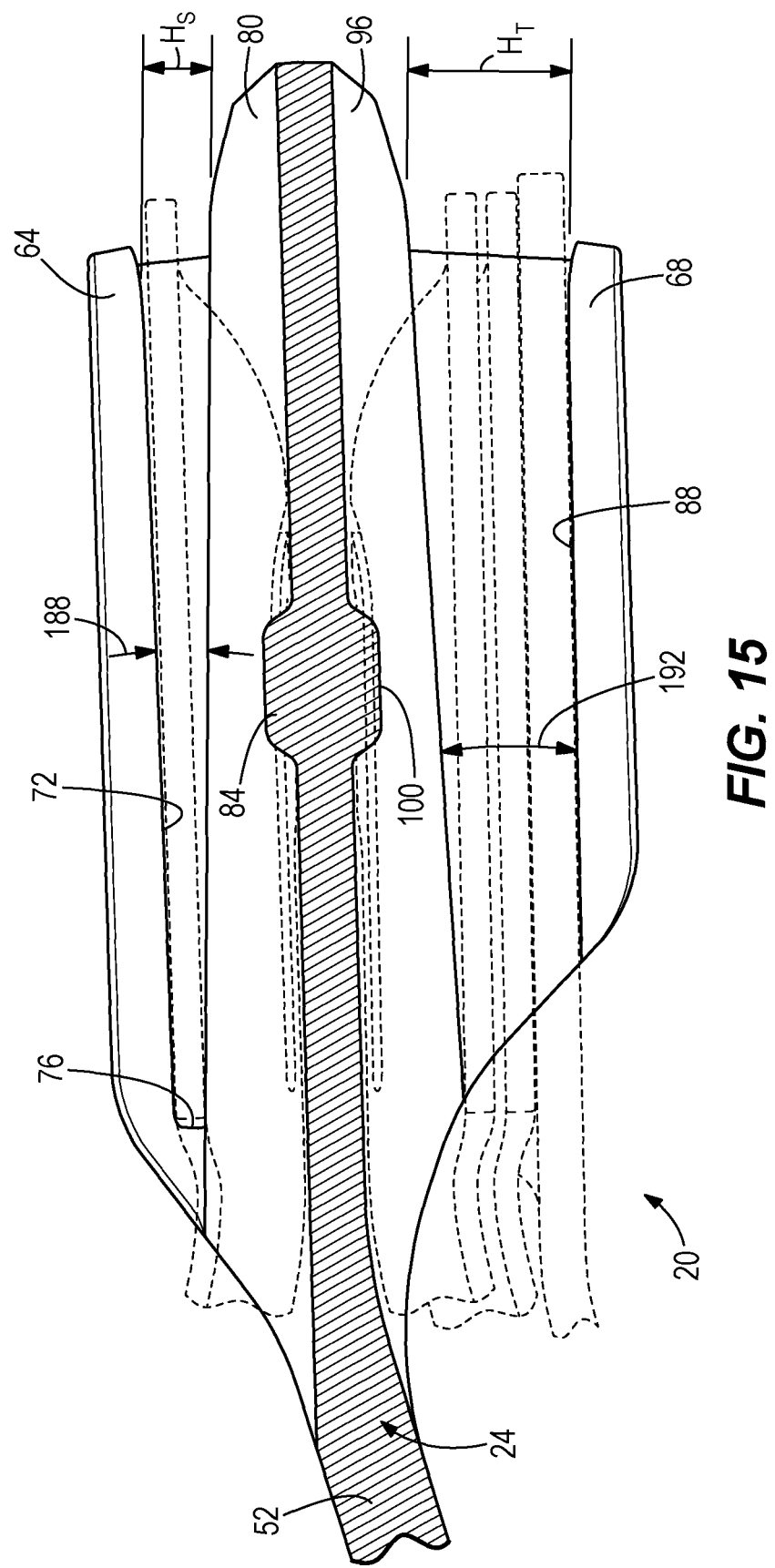
FIG. 15 is a section view of a spatula connector of the spatula of FIG. 2.

As shown in FIG. 15, the storage slots 88 define a storage slot height $H_S$ that is greater than a tong slot height $H_T$ defined by the tong slots 72. In some embodiments, the tong slots 72 define a tongs taper angle 188 of about two and one-half degrees (2.5°). In some embodiments, the tongs taper angle 188 is between about two degrees (2.0°) and about three and one-half degrees (3.5°). In some embodiments, the storage slots 88 define a storage taper angle 192 of about three degrees (3.0°). In some embodiments, the storage taper angle 192 is between about two degrees (2.0°) and about four degrees (4.0°). In some embodiments, the tong slots 72 and the storage slots 88 define taper angles that are the same, different taper angles, or the slots 72, 88 are not tapered. The spoon 28, fork 32, and tool 36 are shown in dashed lines to illustrate the engagement with the tongs dovetail 64 and storage dovetail 68.

In some embodiments, a method of assembling the camping utensil kit 20 includes slidingly engaging a storage slot of a first utensil dovetail connector with a flange of a second utensil to provide a compact storage arrangement, slidingly engaging a tongs slot of the first utensil dovetail connector with the flange of the second utensil to provide a tongs arrangement, and flexing the first utensil, via a living spring, while in the tongs arrangement. Some embodiments include slidingly engaging a third utensil flange of a third utensil with the storage slot, slidingly engaging a tool flange of a tool with the storage slot, slidingly engaging the flange with the tongs slot includes engaging a projection of the first utensil dovetail connector with a depression of the second utensil, and/or slidingly engaging the flange with the tongs slot includes abutting the flange with a tongs shoulder of the first utensil dovetail connector.

While the detailed drawings and specific examples given describe various exemplary embodiments of the camping utensil kit, they serve the purpose of illustration only. It is to be understood that the invention is not limited in its application to the details of construction and the arrangements of components set forth in the preceding description or illustrated in the drawings. Furthermore, other substitutions, modifications, changes, and omissions may be made in the design, operating conditions, and arrangements of the exemplary embodiments without departing from the scope of the invention.

What is claimed is:

1. A camping utensil kit comprising:
    a first utensil including a first food portion, a tongs dovetail connector, and a storage dovetail connector; and
    a second utensil including a second food portion, and a flange sized to be received within the tongs dovetail connector or the storage dovetail connector,
    wherein when the flange is received in the tongs dovetail connector, the camping utensil kit operates as a tongs, and
    wherein when the flange is received in the storage dovetail connector, the camping utensil kit is in a storage arrangement.

2. The camping utensil kit of claim 1, wherein the tongs dovetail connector includes a tapered tongs slot sized to receive the flange.

3. The camping utensil kit of claim 1, wherein the tongs dovetail connector includes a projection, and
    wherein the second utensil includes a spring and a recess formed in the spring and structured to engage the projection.

4. The camping utensil kit of claim 3, wherein the tongs dovetail connector includes a concave surface and the projection is a dimple extending from the concave surface.

5. The camping utensil kit of claim 1, wherein the first utensil includes a living spring structured to provide flexibility during tongs operation.

6. The camping utensil kit of claim 1, wherein the tongs dovetail connector includes a tongs shoulder configured to contact the flange of the second utensil to provide consistent seating of the second utensil within the tongs dovetail connector.

7. The camping utensil kit of claim 1, wherein the second utensil includes a finger structured to engage a portion of the tongs dovetail connector.

8. The camping utensil kit of claim 1, wherein the tongs dovetail connector defines a concave surface, and
    wherein the second utensil defines a convex surface shaped to mate with the concave surface of the tongs dovetail connector.

9. The camping utensil kit of claim 1, further comprising a tool including a tool flange sized to be received in the storage dovetail connector simultaneously with the second utensil.

10. The camping utensil kit of claim 9, wherein the tool includes at least one of a can opener, a package opener, a bottle opener, and a vegetable peeler.

11. The camping utensil kit of claim 9, wherein the storage dovetail connector is sized to receive the second utensil flange, and the tool flange simultaneously.

12. The camping utensil kit of claim 1, wherein the first utensil includes a first utensil handle, and
    wherein the tongs dovetail connector is arranged at about a fifteen degree angle relative to the first utensil handle.

13. A camping tool comprising:
    a spatula including a blade, a spatula handle, a tongs dovetail connector arranged on a first side of the spatula handle, and a storage dovetail connector arranged on a second side of the spatula handle opposite the first side;
    a spoon including a bowl, a spoon handle, and a spoon connector including a spoon flange sized to be received in the tongs dovetail connector or the storage dovetail connector;
    a fork including tines, a fork handle, and a fork connector including a fork flange sized to be received in the tongs dovetail connector or the storage dovetail connector; and
    a tool including at least one of a can opener, a package opener, a bottle opener, and a vegetable peeler, and a tool flange sized to be received in the storage dovetail connector.

14. The camping tool of claim 13, wherein the tongs dovetail connector includes a tapered tongs slot sized to engage one of the spoon connector or the fork connector.

15. The camping tool of claim 13, wherein the storage dovetail connector includes a storage slot sized to receive the spoon flange, the fork flange, and the tool flange simultaneously.

16. The camping tool of claim 13, wherein the spatula includes a living spring structured to provide flexibility when the camping tool is arranged as a tongs.

17. The camping tool of claim 13, wherein the tongs dovetail connector includes a projection sized to be received by a recess of the fork connector.

18. The camping tool of claim 13, wherein the tongs dovetail connector defines an oblique angle relative to the spatula handle so that when the camping tool is arranged as a tongs, a rest angle of about thirty degrees is provided between the spatula handle and the fork handle or the spoon handle.

19. The camping tool of claim 13, wherein the tongs dovetail connector includes a concave surface and a dimple extending from the concave surface.

20. The camping tool of claim 13, wherein the tongs dovetail connector includes a tongs shoulder configured to contact the spoon flange or the fork flange to provide consistent seating of the spoon or the fork within the tongs dovetail connector.

\* \* \* \* \*